United States Patent [19]

Jones et al.

[11] 4,066,946
[45] Jan. 3, 1978

[54] SERVO SYSTEMS

[75] Inventors: John W. D. Jones, Stonehouse; Keith R. Oakey, Cheltenham, both of England

[73] Assignee: Smiths Industries Limited, London, England

[21] Appl. No.: 638,222

[22] Filed: Dec. 5, 1975

[30] Foreign Application Priority Data

Dec. 6, 1974 United Kingdom ............... 52927/74

[51] Int. Cl.$^2$ .......................................... G05B 19/40
[52] U.S. Cl. .................................... 318/685; 318/603
[58] Field of Search ............... 318/685, 696, 603, 138, 318/254

[56] References Cited

U.S. PATENT DOCUMENTS

| | | | |
|---|---|---|---|
| 3,370,289 | 2/1968 | Hedgcock et al. | 318/685 |
| 3,435,310 | 3/1965 | Bradley | 318/685 |
| 3,435,314 | 3/1969 | Bradley et al. | 318/685 |
| 3,904,858 | 9/1975 | Rosshirt | 318/696 X |
| 3,908,195 | 9/1975 | Leenhouts | 318/696 |
| 3,963,971 | 6/1975 | Leenhouts et al. | 318/696 |

*Primary Examiner*—Robert K. Schaefer
*Assistant Examiner*—John J. Feldhaus

*Attorney, Agent, or Firm*—Pollock, Vande Sande & Priddy

[57] ABSTRACT

A counter-pointer display of aircraft altitude is driven by a servo in accordance with a digital representation of height provided at regular intervals by an air-data computer. The content of a first register is updated regularly with the height representation, and the difference between this and the content of a second register is entered into a third register. The content of the second register is updated rapidly from a shaft encoder that is coupled to be driven together with the counter-pointer display by a stepping motor, and the content of the third register is updated in synchronism with the updating of the first register to staticize the error between the input height-representation and the output representation provided by the counter-pointer display. The stepping motor is supplied with pulses at a rate dependent on the magnitude of the staticized error value via a pulse-rate divider, the pulse-rate divider being supplied with a regular pulse train via a gate device that is operable to block passage of pulses of the pulse train to the divider. The proportion of pulses passed by the gate device and the magnitude of the voltage energization of the motor are both regulated in accordance with the magnitude of error value staticized by the third register.

14 Claims, 1 Drawing Figure

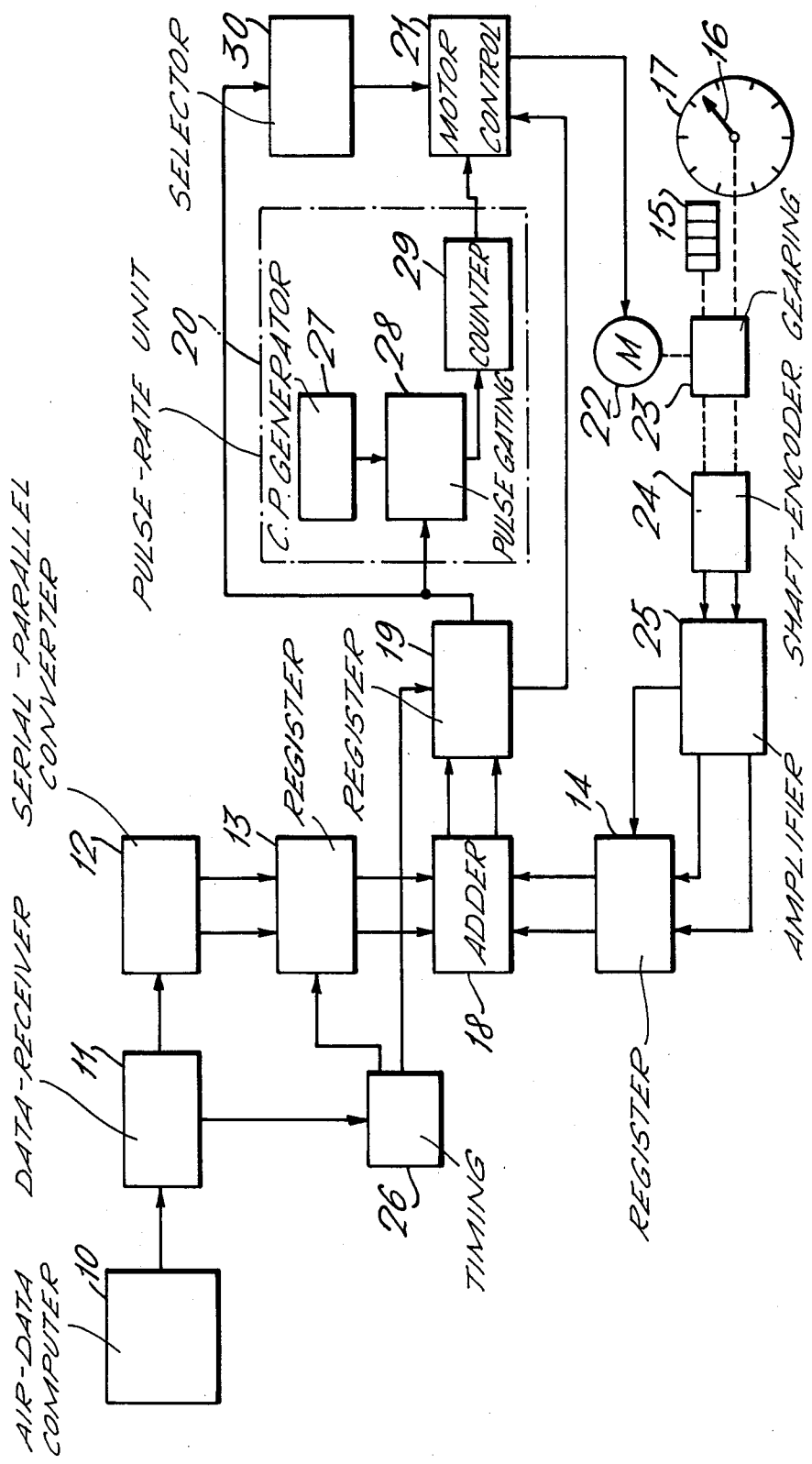

SERVO SYSTEMS

This invention relates to servo systems and in particular to servo systems for providing output drive in accordance with an input demand that changes intermittently. Servo systems of this kind may arise where the input demand is in digital form.

Where the input demand is a digital position-demand, a signal in accordance with the error between the demanded position and the actual position of the servo-controlled element may be used to determine the speed with which the element is driven towards the demanded position by the servo. In such a case, and in accordance with conventional servo practice, a position-feedback signal representing the actual position of the servo-controlled element is compared continuously with the input demand to derive the error signal. However this has been found to give rise to undesirable fluctuation in the drive-speed, especially in circumstances where the digital input-demand changes uniformly at a high rate.

In the latter circumstances, the servo error is initially of large magnitude immediately following updating of the digital value of the input demand, and then progressively decreases as the control element is brought closer into accord with the updated value. At the next updating, the change in the demanded value gives rise once again to a large magnitude of servo error which decreases progressively until the next updating, so that the servo drive to the controlled element is provided in successive bursts, each of initially high, but declining, speed. Although attempts at damping out the consequent fluctuating response have been contemplated, they do not offer an entirely satisfactory solution to the problem.

It is an object of the present invention to provide a form of servo system that can be used to overcome this problem.

According to the present invention, a servo system for providing output drive in accordance with an input demand that changes intermittently, comprises means for staticizing the error between the servo output and the input demand in the intervals between successive changes in the input demand, and means for providing the output drive in dependence upon the staticized error value.

With the servo system of the present invention, the servo drive in the intervals between changes of the input demand is effectively stabilized at a constant value so that smooth servo operation can be readily achieved. The servo error may be staticized in a register which is supplied with an error signal derived as the difference between the actual and demanded values of the servo output, and which is updated recurrently in accordance with the derived error signal. Values of the input demand and servo outputs may be staticized in two further registers respectively, that are updated recurrently, the servo-error signal supplied to the first-mentioned register being in this case derived simply as a difference between the values staticized in the two further registers. However where the input demand and servo output are staticized in this way, it may be possible to avoid the need for the first-mentioned register, the servo error being in itself already staticized in the difference between the two values staticized in the two registers.

A servo system in accordance with the present invention will now be described, by way of example, with reference to the accompanying drawing which is a block schematic representation of an aircraft instrument including the servo system. The instrument illustrated is an altimeter for use in providing a counter-pointer display of altitude in accordance with digital representation of height of the aircraft which is provided at regular intervals by an air-data computer. The same general form of instrument is applicable however, to the display of other parameters (in particular of airspeed, Mach number and vertical speed) in accordance with other appropriate digital representations provided by the air-data computer. The air-data computer provides these digital representations in accordance with measurements of, in particular, static and dynamic air-pressures and of other variables appropriate to computation of the values of aircraft height and the other parameters.

Referring to the drawing, the digital representation of height is supplied by the air-data computer 10 in serial binary form to a data-receiver unit 11 of the altimeter. The representation is converted to parallel form by a converter 12 and in the converted form is entered in a register 13. The measurement of aircraft altitude represented by the content of the register 13 is updated repeatedly with each successive digital representation of height signalled (not necessarily regularly) by the air-data computer 10.

The content of the register 13 is compared with the content of a register 14 that is updated repeatedly in accordance with the value of aircraft height as this is being indicated by the altimeter. In the latter respect, the altimeter includes a digital-drum counter 15 which provides an indication of the aircraft height in units of 1,000 feet and a pointer 16 which is positioned angularly with respect to a graduated circular-scale 17 that covers 1,000 feet for each revolution of the pointer 16. The content of the register 14 is a binary representation of the height indicated by the combined display provided by the pointer 16 and counter 15. The complement of the content of the register 14 is added to the content of the register 13 in an adder 18 so as to derive the difference between the value of aircraft height demanded by the air-data computer 10 and the value indicated by the counter-pointer display. The binary representation of this difference or error is entered from the adder 18 into a register 19.

A unit 20 supplies pulses to a motor-control unit 21 at a rate proportional to the error-content of the register 19. The unit 21 is supplied with a signal that signifies the sense of the error-content of the register 19 and in accordance with this and the pulses supplied from the unit 20 derives an appropriate sequence of command signals for application to a stepping motor 22. The motor 22 drives the counter 15 and pointer 16 through step-down gearing 23 at a speed determined by the pulse rate supplied by the unit 21 and in the appropriate direction to reduce the error between the demanded and indicated values of aircraft height.

Feedback of the indicated value of height is provided from coarse and fine outputs of a shaft-encoder 24 that is also driven by the motor 22. The binary-code representation of the indicated height from the encoder 24 is supplied via an amplifier unit 25 to update the content of the register 14 with each motor step.

The contents of the registers 13 and 19, are updated in a recurrent cycle synchronized to operation of the data-receiver unit 11 by a timing unit 26. The unit 26 acts to ensure that the content of the register 19 is not updated in the cycle until after a new height representation is received from the air-data computer 10 and entered in the register 13. Thus until a new height representation is entered into the register 13, the same pulse rate is applied from the unit 20 to command the same stepping-speed of the motor 22, irrespective of reduction of the actual error between demanded and indicated values of height that may have been accomplished.

If the register 19 were omitted and the error representation from the adder 18 applied directly to the pulse-rate unit 20, then the pulse rate applied to the motor-control unit 21, and consequently the stepping-speed demanded of the motor 22, would be reduced in steps continuously as the motor 22 steps on to reduce the error between the height-represented by the content of the register 13 and the height indicated by the counter-pointer display. For each step of the motor 22 the error computed by the adder 18 would reduce by one increment and decrease the pulse rate, and thus the motor speed, accordingly. Whereas such operation may be acceptable for very slow or small discrete changes of height of the aircraft, it does have a disadvantage when the height change is fast or is of large magnitude. Throughout each successive updating of the register 13 in either of the latter circumstances, the speed of the stepping motor 22 would start at a high value commensurate with the magnitude of the computed error, and would then decrease progressively and then increase suddenly to the high value again upon the next updating. A cyclic fluctuation would as a result be introduced into the movement of the counter 15 and pointer 16, and this can be very disconcerting to an observer of the display, even if not damaging to the mechanism. Disconcerting and damaging fluctuations of this nature are avoided using the register 19 to staticize the error at updating and thereby achieve a steady stepping-speed demand throughout the intervals between successive updatings.

The register 19 is updated to allow change of the stepping speed demanded of the motor 22 only following each updating of the register 13. A steady stepping speed is therefore established commensurate with the error existing when the updating of the register 13 takes place, and this speed is varied only in accordance with the error at the next updating. In this way, a steady change of height signalled by the air-data computer 10 throughout successive updatings of the register 13 will give rise to a steady stepping-speed demand with consequent close, smooth following by the counter-pointer display.

Smoothness of operation depends on the relationship that exists between the magnitude of error staticized in the register 19 and the pulse rate in consequence generated. There are two important aspects of this matter, and of these the first concerns the nature of the unit 20. This unit could simply act to derive a train of equi-spaced pulses having a pulse rate (recurrence frequency) F equal to the maximum stepping speed required of the motor 22, and to block appropriate pulses from the train whenever a lower speed is required. For example, a pulse rate F/2 would be derived by blocking alternate pulses and of F/4 by blocking three pulses in every four. With each of these examples the pulses of the train passed to the unit 21 would be evenly spaced but this would not be so for all rates. The worst situation is where a pulse is blocked immediately after two pulses at the rate F, since this would appear to the motor-control unit 21 as an immediate halving of the demanded motor speed. An effective smoothing out of the rapid fluctuation that would otherwise occur in such circumstances, is achieved with the system of the present invention by initially deriving a higher pulse rate than is required for motor control and then dividing this down by an appropriate factor.

As shown in the drawing, the pulse-rate unit 20 includes a clock-pulse generator 27, and this generates a train of equi-spaced clock pulses at the pulse rate NF (where N in this specific case is for example 16, and F is, as above, the maximum stepping speed required of the motor 22). A pulse-gating unit 28 acts to pass all the generated pulses on to the motor-control unit 21 via a pulse counter 29 whenever the error is commensurated with the maximum stepping speed F required, and otherwise to block certain of the pulses of the train in accordance with the rate appropriate to the error staticized by the register 19. The counter 29 acts as a pulse-rate divider with a division factor N, and so the pulse rate of the pulse train applied from the counter 29 to the unit 21 lies within the appropriate range up to F. However this pulse train has a more regular and equalized pulse distribution than otherwise would be the case, by virtue of the application of the pulse blocking to the higher-rate train. This more regular and equalized pulse distribution assists significantly in the achievement of smooth operational movement of the display.

The second aspect concerned with the achievement of smooth operation, is the minimum time taken for the system to cancel out an error and the range of discrete pulse rates that are available commensurate with different magnitudes of error. The minimum time to cancel out an error is chosen in the present case to be twice the minimum interval (for example 1/20 second) between successive signallings with entry into the register 13, of the measured height representation provided by the computer 10. Furthermore, the greater the number of different pulse rates, and consequently stepping-motor speeds, that are utilized, the smoother the presentation by the counter-pointer display. In one specific application 32 discrete rates are available and each step of the motor 22 is equivalent to 2 feet, the height error which produces the maximum stepping speed of the motor 22 being 64 feet.

The magnitude of the error staticized in the register 19 is used to regulate the magnitude of the energizing voltage supplied to the stepping motor 22. To this end, the staticized error is applied to a selector unit 30, and while the error magnitude is small, this selects and applies to the motor 22 energizing voltage to the normal operational rating of the motor 22. However when the error magnitude is large and the stepping speed required is high, then an increased value of voltage is selected by the unit 30 to energize the motor 22. This enables a high current to be drawn for rapid acceleration of the motor 22 in such circumstances. More than just two levels of energizing voltage could be utilized for different levels of error if desired.

The provision of the register 14 in the system of the described example arises principally from operational requirements of the shaft-encoder 24 employed. Were an encoder that is capable of providing a continuously unambiguous encoding of shaft position to be used, the digital output of this could be applied directly to the adder 18. However, a register such as the register 14 could in these circumstances still be used and updated with the updating of the register 13. A steady error corresponding to that staticized by the register 19 in the arrangement shown in the drawing, would then be signalled from the adder 18 until the next updating; there would then be no necessity for the separate register 19.

We claim:

1. In a servo system in which drive means provides output drive in accordance with error between the output of the servo and an input demand that is updated in value intermittently, the improvement for minimizing output-velocity fluctuation of the system in response to high-rates of change of the input-demand value, wherein the system includes means to staticize the said error in the intervals between successive updatings of the input demand, said staticizing means updating the staticized value of said error only in accordance with updating of the said input-demand value, and wherein said drive means is coupled to said staticizing means to respond to the error-values staticized in respect of successive updatings of said input demand, said drive means responding to each such staticized error-value to drive the said output in accordance with the staticized error-value at a substantially constant rate throughout until the next updating of said error value.

2. A servo system according to claim 1 including means for deriving a digital representation of the difference between the actual and demanded values of said servo output, and wherein said staticizing means includes a register, means operable to enter said digital representation into said register, and means for operating said entry means periodically to update the digital content of said register, said drive means providing said output drive at a substantially constant rate in accordance with the updated content of the register.

3. A servo system according to claim 2 including a further register, means for periodically updating the digital content of said further register in accordance with said input demand, means for deriving a digital representation of said servo output, means for subtracting the digital representation of said servo output from the content of said further register to derive said digital representation of the difference between the actual and demanded values of servo output.

4. A servo system according to claim 1 including a first register, means for periodically updating the digital content of said first register in accordance with said input demand, a second register, means for periodically updating the digital content of said second register in accordance with said servo output, and means for deriving a representation of the difference between the contents of the said first and second registers, and wherein said drive means is responsive to said difference to provide said output drive in accordance therewith.

5. A servo system according to claim 1 wherein said drive means includes a stepping motor and motor-control means to command the stepping motor to step on at a rate dependent upon the magnitude of the staticized error value.

6. A servo system according to claim 5 wherein the said motor-control means comprises a pulse-rate divider, gating means, and a pulse generator to supply a regular pulse train to the pulse-rate divider via said gating means, said gating means being operative to block passage of pulses of said pulse train to said pulse-rate divider to an extent dependent upon the magnitude of said staticized servo-error value, and wherein said stepping motor is responsive to the pulses supplied by said pulse-rate divider to step on in accordance therewith.

7. A servo system according to claim 1 wherein said drive means includes an electrically energizable stepping-motor, said stepping motor when electrically energized being responsive to electrical pulses supplied thereto to provide stepwise drive in accordance therewith, means to supply electrical pulses to the stepping motor at a rate dependent upon the magnitude of the staticized error value, and means to increase the magnitude of electrical energization of the stepping motor in dependence upon the magnitude of the staticized error value.

8. A servo system for providing output drive in accordance with an input positional-demand that changes intermittently, comprising a first register, means for updating the digital content of the first register in accordance with the input demand, an output member drivable to have a displacement in accordance with said positional-demand, motor means coupled to said output member for driving said output member, means coupled to said output member to provide a signal representation of the output displacement of said output member, a second register, means for periodically updating the content of said second register in accordance with difference between said signal representation and the digital content of said first register, the updated content of the said second register having a value in accordance with said difference to represent the magnitude of positional error of the said output member, and further means for deriving a command signal in accordance with the updated content of said second register, said command signal having a substantially constant value in accordance with the said magnitude of positional error throughout the interval to the next successive updating of the said second register, said motor means being responsive to said command signal to drive said output member at a substantially constant velocity in accordance with the said magnitude of positional error so that the output member is driven at substantially constant velocity between successive updatings to thereby minimize velocity fluctuation of the output member in response to high-rate change of the input demand.

9. A servo system according to claim 8 wherein said further means for deriving the said command signal is means for deriving a pulse train having a substantially constant pulse rate dependent on the updated content of the said second register, and wherein said motor means includes a stepping motor responsive to said pulse train to provide stepwise drive at a substantially constant velocity in accordance with the said pulse rate.

10. An instrument for providing an output representation of a value that is dependent on the value of an input variable and adapted to minimize velocity fluctuation of said output representation in response to high-rate of change of the value of the input variable, said instrument comprising means responsive to the input variable to provide a digital representation in accordance with the value thereof, a first register, means to update the content of said first register in accordance with the said digital representation, means drivable to provide said output representation, means coupled to said drivable means for providing a digital representation of the value of the output representation provided thereby, a second register, means operative only following each updating of said first register to update the digital content of said second register in accordance with any difference between the said digital representation of the output value and the content of said first register, the content of said second register being updated in accordance with said difference to represent the extent of errors in said output representation as related to the input value of said variable, and drive means responsive to the updated content of said second register for driving said drivable means in accordance therewith, said drive means driving said drivable means at a substantially constant velocity in accordance with said represented error throughout the period between successive updatings of said second register.

11. An instrument according to claim 10 wherein said drivable means comprises a graduated scale and a pointer mounted for movement relative to the scale, and wherein said drive means includes means coupled to said pointer for repositioning said pointer with respect to the said scale at a substantially constant velocity dependent upon the updated content of said second register.

12. An instrument according to claim 10 wherein said drivable means includes angularly drivable display means for providing an output display in accordance with the angular position to which it is driven, said means for providing a digital representation of the value of the said output representation comprises means coupled to said display means for providing a digital representation in accordance with the said angular position, and said drive means comprises means for applying angular drive to said display means at a substantially constant rate in accordance with the updated content of said second register.

13. An instrument according to claim 12 wherein said display means comprises a digital-drum counter.

14. An instrument according to claim 12 wherein said means responsive to the input variable is means responsive to air pressure to provide a digital representation of the value of a function dependent thereon, and wherein said drivable means comprises means to provide an output representation of the value of said function.

* * * * *